(No Model.)
G. W. DICKINSON & H. H. WARNER.
BRAKE FOR RAILWAY CARS.
No. 531,588. Patented Dec. 25, 1894.
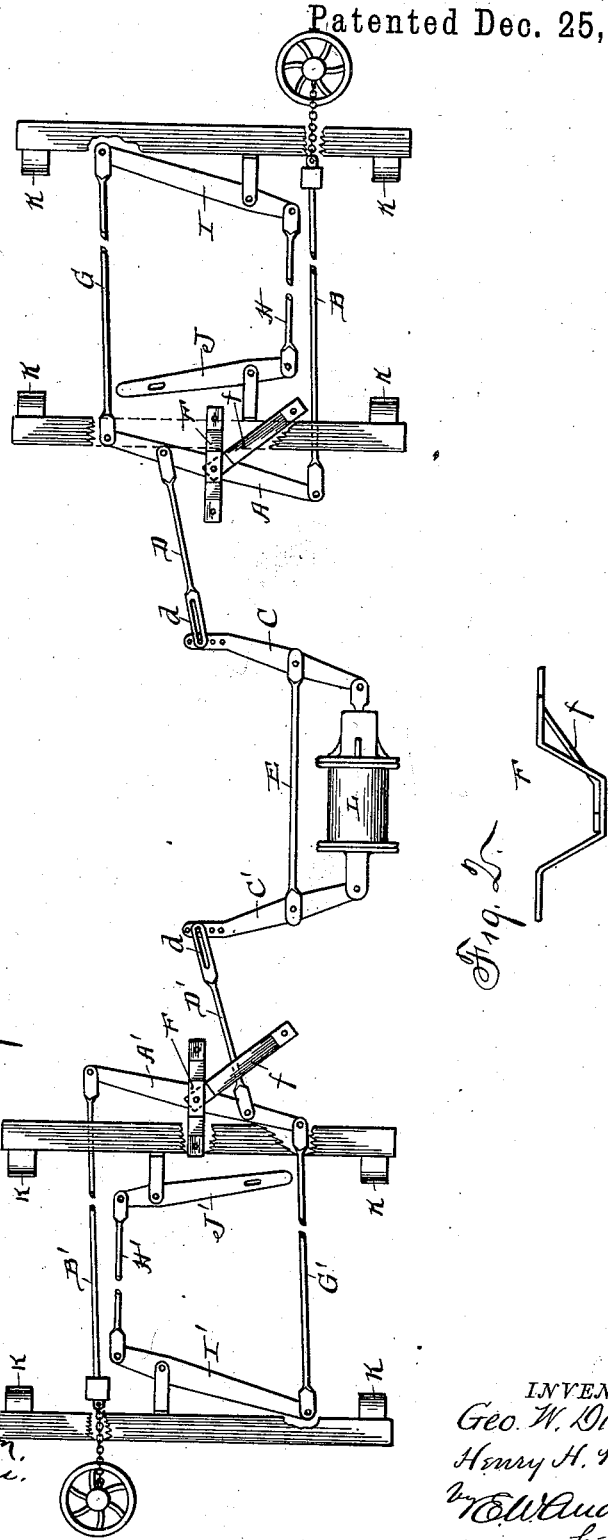
WITNESSES
INVENTORS
Geo. W. Dickinson
Henry H. Warner
by E. W. Anderson
his Attorney

UNITED STATES PATENT OFFICE.

GEORGE W. DICKINSON AND HENRY H. WARNER, OF TACOMA, WASHINGTON.

BRAKE FOR RAILWAY-CARS.

SPECIFICATION forming part of Letters Patent No. 531,588, dated December 25, 1894.

Application filed April 18, 1894. Serial No. 508,019. (No model.)

*To all whom it may concern:*

Be it known that we, GEORGE W. DICKINSON and HENRY H. WARNER, citizens of the United States, and residents of Tacoma, in the county of Pierce and State of Washington, have invented certain new and useful Improvements in Car-Brake Mechanism; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a bottom plan view of the invention. Fig. 2 is a detail of fulcrum.

This invention relates to car brake mechanism, and is designed to improve existing mechanisms of this character whereby the hand brakes may become more serviceable in connection with the air, or power brake; and the invention consists in the novel construction and combination of parts all as hereinafter specified and pointed out in the accompanying claims.

The accompanying drawings represent an arrangement of brake mechanism which in general is similar to that known as the "Hodge system," but which also embodies our improvements as will now be described.

In the said drawings, the letters A, A', designate the two levers to which the hand and power mechanisms for the two ends of the car are connected, the hand brake rods being marked B and B', the cylinder levers C and C', the connecting rods D and D', and the cylinder lever rod E. These levers A and A' are usually termed "floating levers," and a feature of our present invention consists in fulcruming said levers intermediate of their end portions upon depending brackets F, F, braced at *f*, and in connecting the rods D and D' to said levers between their centers and the power brake ends, instead of at the centers, as in the old form. By this change we accomplish the following object: In the movements of the levers A, A', the hand brake ends thereof travel toward the hand brakes, thereby giving the slack resulting from the application of the power brake toward the hand brakes, whereby the latter are made capable of holding and maintaining the power of the air brakes should they, from any cause, leak off, and become useless.

A further feature of the invention consists in making a sliding connection between the rods D, D', and the respective cylinder levers C, C', by means of a slotted jaw *d*, as shown. In the old form, the rods were fixed at this point by a simple pivotal connection. By the present arrangement, the hand brakes may be operated separately, and are effective at all times, to help or assist the power brakes as well. The arrangement also makes the brakes of each end of car independent, so that in the event of any breakage or defect at one end, the other end remains operative.

G, G', designate the top rods at the respective ends of the car; H, H', the bottom rods; I, I', the live truck levers; J, J', the dead truck levers; K, the brake shoes, and L the power cylinder.

Having thus described our invention, what we claim as new, and desire to secure by Letters Patent, is—

1. In car brake mechanism of the class hereinbefore described, the levers A, A, having each a connection with the hand brake mechanism at one end, and with the brake applying levers at the opposite end, and a fulcrum intermediate of their ends, and a connection between each of said levers and the power brake mechanism, such points of connection being between the fulcrums and the power brake ends, substantially as specified.

2. In car brake mechanisms, the combination of the cylinder levers, the hand brake rods, the levers A, A', the rods D, D' forming the connections between the cylinder levers and the levers A, A', said rods having each a sliding connection with the respective cylinder lever and a connection with the lever A or A' between its fulcrum and power brake end, substantially as specified.

3. In car brake mechanisms of the class described, the rods D, D' having each a sliding connection at one end portion with the respective cylinder levers, and at the other end portion a connection with the brake shoe operating lever between the fulcrum of the latter and its power brake end, substantially as specified.

4. In car brake mechanisms, the combination of the brake shoes, the lever actuating said shoes and fulcrumed intermediately of its end portions, the intermediate connections between said lever and shoes, the hand brake rod, the cylinder lever, and the rod having a sliding connection at one end portion with the cylinder lever and at the opposite end portion a connection with the said intermediately fulcrumed lever between the fulcrum of the latter, and its power brake end, substantially as specified.

5. In car brake mechanism, the combination of the cylinder levers C, C', the rod E, connecting said levers, the intermediately fulcrumed levers A, A', the rods D, D' having each a sliding connection at one end portion with the respective cylinder lever, and at the opposite end portion a connection with the lever A or A' between the fulcrum of the latter and its power brake end, the hand brake rods connected to the levers A, A' at the other side of their fulcrums, the brake shoes, and connections between the levers A, A' and the respective sets of brake shoes, substantially as specified.

In testimony whereof we affix our signatures in presence of two witnesses.

GEORGE W. DICKINSON.
HENRY H. WARNER.

Witnesses:
W. O. CHAPMAN,
W. E. BOND.